July 31, 1945.  W. A. SCHULZE  2,380,875
CATALYTIC TREATMENT OF HYDROCARBONS
Filed Feb. 10, 1942
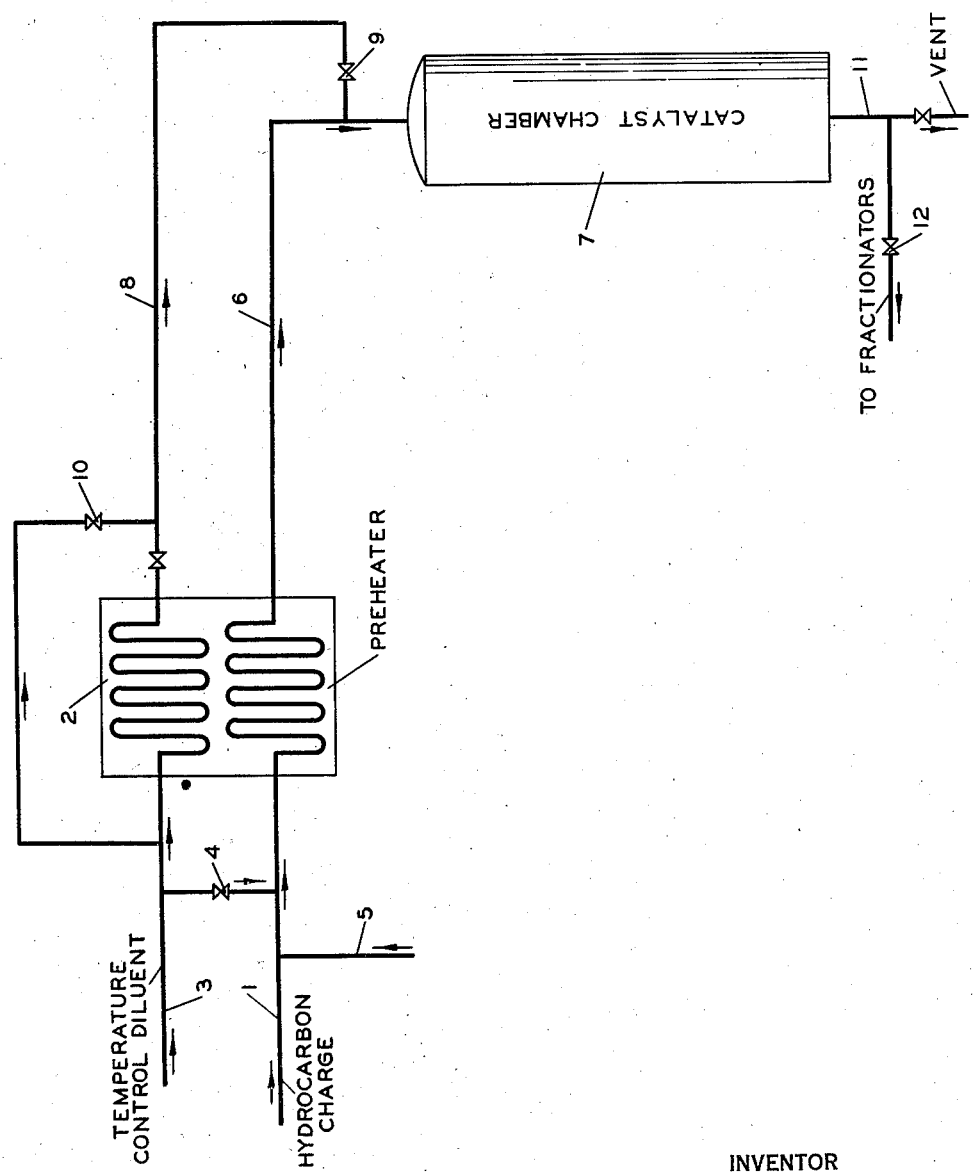
INVENTOR
WALTER A. SCHULZE
BY
ATTORNEY Patented July 31, 1945

2,380,875

UNITED STATES PATENT OFFICE 2,380,875

CATALYTIC TREATMENT OF HYDROCARBONS

Walter A. Schulze, Bartlesville, Okla., assignor to Phillips Petroleum Company, a corporation of Delaware Application February 10, 1942, Serial No. 430,281

1 Claim. (Cl. 260—680)

This invention relates to the catalytic treatment of hydrocarbons and more particularly it relates to a method of improving conversions in catalytic hydrocarbon conversion processes in which the activity of the catalyst declines with use during the convertive period.

In many catalytic hydrocarbon conversion processes, especially such processes as cracking, dehydrogenation, reforming, polymerization, aromatization, isomerization, and the like, the catalyst mass used to promote said conversions often exhibits a progressive loss in activity or convertive powers as the reaction proceeds. This decrease in activity of the catalytic material during the treating period is often ascribed to the deposition of carbonaceous contaminants such as coke and high-boiling tarry material on said mass. The detrimental effects of such accumulation of contaminants may be evidenced in a number of ways, such as increased resistance to vapor flow, but the adverse effect on catalyst activity is ordinarily due to the masking of the particles or active surfaces of the catalyst, especially if such deposition occurs extensively in the pores of a catalyst whose activity is largely dependent on its porous nature and adsorbent characteristics. When the catalyst activity has declined to such an extent that it becomes uneconomical from the standpoint of product yield and quality to continue its use, renewal of the catalyst becomes necessary. This may involve either actual replacement with new catalyst, or the treatment of the spent material to remove the carbonaceous deposits and thus restore the activity. The change in conversion rate and hence in the volume and composition of the conversion products that occurs with decreasing catalyst activity may also have an adverse effect on the operation of auxiliary process equipment such as heat exchangers, fractionators, condensers, etc. For instance, if the equipment for a specific reaction is designed for operation at a certain conversion level (either the maximum, average, or minimum level of such reaction) it will not operate at maximum efficiency while conversion varies from an initial peak to final minimum values with the changing catalyst activity.

It is known that catalyst activity can be increased and/or substantially maintained by a change in physical reaction conditions, such as an increase in temperature or pressure or lower flow rates of reactants. Such alterations in the physical reaction conditions may be cooperative in producing longer contact time between the convertible material and the catalyst, with the latter at a higher potential activity level because of higher temperature. It has been proposed that such changes in reaction conditions be made continuously during any given conversion period so that there is an apparently uniform catalyst activity and consequently little change in the rate or type of transformations that are taking place during said period. However, such changes in physical conditions are difficult to accomplish and to control and the resulting variations in process operations may also cause undue complications in the control of all process equipment.

An object of this invention is to provide an improved process for the catalytic conversion of hydrocarbons.

Another object of this invention is to attain relatively uniform conversion in reactions involving a catalyst mass which gradually loses its activity during the conversion period, and to achieve this uniform conversion while avoiding any undue changes in the operation of process equipment.

A further object is to provide an improved process for controlling the temperature and reactant concentrations in a catalytic hydrocarbon conversion process.

A still further object is to provide an improved process for the use of a substantially inert heat-carrier diluent in controlling the temperature level of a conversion process. Other objects will become apparent from the following disclosure.

I have discovered a novel and simple method of changing the operating conditions, namely temperature and reactant concentration, so that the objects of this invention can be easily achieved. This is accomplished by (1) heating the convertible material to above the maximum temperature to be employed during the conversion period; (2) passing the preheated material at a substantially constant temperature level and flow rate to a chamber containing the convertive catalyst; (3) adding to the preheated charge at a point between the preheater and the catalyst chamber sufficient diluent at a lower temperature than that of the charge to produce a mixture temperature suited to the initial maximum catalyst activity; (4) as the conversion period progresses and the catalyst activity declines, decreasing the volume of cooler diluent added ahead of the catalyst to gradually raise the charge temperature. By proper proportioning of the stream of preheated convertible material with the stream of cooler diluent, the temperature of the charge mixture and consequently of the catalyst is steadily raised to substantially maintain the conversion rate. Simultaneously, the concentration of convertible material in the charge mixture is increased, and a longer reaction time between hydrocarbon and catalyst is attained. In this manner, the reaction conditions are continuously readjusted to conform to the activity of the catalyst at any specified time in the conversion period.

It is thus seen that by regulating the flow rate of one fluid stream, it is possible to vary the temperature and reaction time within the conversion zone. Since these effects are cooperative in promoting conversion, the variation in diluent volume which produces both in the present invention is easily held within practical operating limits. When the addition of cooler diluent is discontinued, the charge and catalyst reach the maximum temperature of the conversion period, and when conversion declines at these conditions, the catalyst is ordinarily reactivated before another conversion period is begun.

To illustrate methods of practicing this invention, reference will be made to the accompanying flow diagram which shows a possible arrangement of equipment for a catalytic conversion of a hydrocarbon stock.

The hydrocarbon charge enters by line 1 and is heated in preheater 2 prior to introduction to the conversion zone. A diluent is usually added to the charge ahead of the preheater. If the diluent that is premixed with the charge is to be the same as that used for the temperature control, said diluent may be obtained from line 3 by way of valve 4. If a different diluent is to be used it may be obtained by way of line 5 from a source not shown. The charge mixture heated to the desired temperature then passes by transfer line 6 to the catalyst chamber 7. The temperature control diluent from line 8 is added to the charge mixture at the transfer line just ahead of the catalyst case and the proportion of added diluent and thus the temperature of the vapor mixture is controlled by valve 9. This temperature control diluent supplied from line 3 is preheated to the desired temperature by passage through a heating coil in preheater 2 or in any other convenient manner. Alternatively, a portion of the diluent may by-pass the heater, and the temperature of the fluid in line 8 may be regulated by the volume of cool fluid passing through valve 10. The catalyst effluents are taken through line 11 and valve 12 to fractionators and other process equipment for the separation of diluent, products, and unconverted material.

As the accompanying illustration was presented in order that my process may be more easily understood, no attempt was made to complicate the description with numerous modifications and/or alterations. Among the more or less conventional arrangements which may be included are the use of various types and numbers of catalyst cases, the use of heat exchangers and fractionating equipment, and finally, apparatus for reactivation of the catalyst in a continuous process.

As mentioned hereinabove, it is often desirable to add a diluent or substantially inert material to the hydrocarbon charge ahead of the preheater. This diluent may be the same as that employed for the temperature control or it may be a different material derived from an entirely separate source, such as processing operations which produce the charge stock. However, it is ordinarily possible and satisfactory to employ the same diluent material for both applications.

The volume of diluent that is added ahead of the preheater is ordinarily limited to that amount which produces beneficial operational effects without causing uneconomic increases in equipment size and the cost of handling and separating an inert material. Thus, in the catalytic cracking of relatively heavy hydrocarbon oils such as gas oil, reduced crudes, and the like, it is desirable to introduce relatively large volumes of diluent in order to reduce the charge viscosity and coking and thermal cracking in the preheater. In reforming, dehydrogenation, and the like, when lighter more refractory stocks such as gasoline or light hydrocarbons are treated, smaller amounts of diluent are sometimes employed. In certain other reactions, such as polymerization and alkylation of low-boiling hydrocarbons, addition of a diluent before the preheater may or may not be practiced. However, in all cases the amount of diluent is so chosen as to satisfy predetermined reactant-diluent ratios for the particular conversion involved.

The volume of relatively cool diluent to be added ahead of the catalyst is chosen to conform to the degree of temperature reduction and/or dilution desired. In the matter of temperature reduction, simple calculations based on the temperature and specific heats of the preheated charge and the cool diluent indicate the requisite volume for any particular application. Obviously, some variation is possible and will be dictated by other factors affecting the conversion, as to whether a temperature differential or the volume differential shall be emphasized in proportioning the two fluid streams. Thus, in one case it may be desirable to add a small volume of diluent at a very low temperature, while in another case a larger volume of diluent at a somewhat higher temperature may be preferred to coordinate the changes in both temperature and reactant concentration with other process requirements.

The magnitude of the temperature reduction at the beginning of the conversion period, or, in other words, the temperature range to be covered during the conversion period, will depend on the catalyst and its active temperature range for the desired conversion. Thus, the initial conversion temperature must not be below that producing satisfactory conversion at peak catalyst activity, and the final conversion temperature should not be so high as to promote undesirable side reactions at minimum catalyst activity. Between these limits, temperature variations produce the desired variation in catalyst activity toward the desired conversion without altering the selectivity of the convertive reaction. The temperature range involved, that is, the difference between the temperatures of the materials charged at the inlet to the catalytic zone at the beginning of the conversion period and at the end of the conversion period, seldom exceeds about 100° F. and is more frequently in the range of 25 to 100° F.

The temperature adjustments obtained by the present invention will apply directly to the vapor mixture entering the catalyst case, and the values obtained will vary at subsequent points with the nature of the conversion and with mechanical heat-transfer effects within the conversion zone. However, since the heat gain or loss accompanying reaction is proportional to the extent of conversion, and the mechanical heat-transfer effects are substantially constant, the adjustments will be reflected uniformly throughout the conversion zone. For example, in an endothermic conversion such as gas-oil cracking wherein the heated vapors are substantially the sole source of heat, a catalyst inlet temperature of 975° F. may result in a catalyst outlet temperature of about 925 to 950° F., depending on the extent of conversion. In such an instance, raising the inlet temperature to 1000° F. may produce an outlet temperature of about 950 to 975° F. with extent of conversion maintained at substantially the same level.

The conversion temperatures obtained by the present invention may be measured at the inlet to the catalytic zone or may be calculated as a mean or average temperature throughout the catalyst mass. Since the actual temperature adjustment is accomplished at the inlet to the catalytic zone, this reference point is often preferred. The process and method of control are applicable also to operations wherein heat is supplied through indirect exchange to the catalyst mass so as to reduce the temperature gradient through the mass in the direction of fluid flow.

In applying the process of the present invention to exothermic conversions, the principles and operating methods are essentially unchanged, and uniform conversion may be obtained while limiting the temperature rise due to reaction to desirable values. Thus, both inlet charge temperature and concentration of convertible material are regulated to produce satisfactory conversion without allowing catalyst temperatures to exceed the desired limits. As the catalyst activity decreases, the increasing inlet temperature and reactant concentration combine to maintain conversion.

Since the process of my invention is applicable generally to hydrocarbon conversions over contact masses wherein said contact masses gradually lose their activity, it may be utilized with a great variety of hydrocarbon stocks and catalytic materials, and under a wide range of physical operating conditions. For example, it is capable of application in catalytic cracking, dehydrogenation, aromatization, reforming, polymerization, isomerization, and similar hydrocarbon conversions operating on stocks ranging from heavy reduced crudes to light normally gaseous hydrocarbons. In specific instances, both the catalyst and the operating conditions are chosen to conform to values known to favor the particular conversion.

The materials which are suitable for use as diluents are those satisfactorily heat stable at the temperatures employed and capable of performing the desired functions of reducing thermal decomposition in the preheating step and of regulating the temperature of the charge mixture. These materials include the light refractory hydrocarbons of up to five carbon atoms or various mixtures thereof, as well as gases such as nitrogen, carbon dioxide, steam, and mixtures comprising them, such as substantially oxygen-free flue gas or combustion gas. Particularly desirable from the standpoint of availability and ease of separation from hydrocarbon products is steam, which may be considered my preferred diluent. Also suitable for many conversions are the light hydrocarbon mixtures comprising methane, ethane, propane, and butane in various ratios which are often available or may be produced in the conversion process. Or, instead of using a single type diluent, different materials may be supplied to the process, in one case for admixture with the charge ahead of the preheater, and in the other case for injection in the transfer line as a temperature regulating medium.

While the changes in the volume of diluent added ahead of the catalyst often produce corresponding changes in the volume of the fluid handled in subsequent apparatus, the changes are uniform as to direction and take place during periods of time which may range from several hours to as long as several days. Thus, there are no rapid fluctuations or unpredictable variations to handle, and the uniform decrease in volume of added diluent may be satisfactorily predicted and allowed for in process operations. A further advantage in this connection is the dual effect of increasing both temperature and concentration, which minimizes the actual variations in fluid volumes. When steam is employed as the diluent and process pressures are suitably high, this diluent may even be mainly condensed and removed in subsequent apparatus so that substantially no hydrocarbon volume variations are noted in its application according to the present invention.

The contact catalysts useful in my process are those having activity in promoting the desired conversion. For cracking, reforming, dehydrogenation, desulfurization, aromatization and similar reactions those rugged mineral ore materials comprising bauxite, brucite, various clay-type minerals, and active aluminum silicates have been found to be particularly useful. These natural catalysts may be used after activation by various means and/or may be promoted with minor amounts of active metals or metal salts or oxides. Also useful are such materials as zirconia, titania, magnesia, alumina, and various silica-alumina combinations. These latter may be promoted with minor quantities of metal oxides, particularly those of chromium, nickel, and zinc. For catalytic polymerizations, copper pyrophosphate, aluminum chloride, adsorbent materials impregnated with phosphoric acid, and various types of silica-alumina combinations have been found useful.

After certain periods of service in the process the catalyst activity decreases to such an extent that the conversion level cannot properly be maintained by a feasible increase in temperature or contact time. When such loss of catalyst activity has occurred the catalyst may be replaced, or the catalyst activity may be restored to substantially the original level by reactivation at controlled temperatures in air oxidizing atmosphere. For this reactivation it is usually preferred to pass oxygen-containing gases such as mixtures of air with steam, nitrogen, carbon dioxide, or inert combustion gas through the catalyst to burn off the materials responsible for deactivation without thereby producing combustion temperatures harmful to the catalyst.

The following examples are offered to illustrate some applications of my process.

*Example I*

A catalytic gas oil cracking operation on a charge having a specific gravity of 34° API and a boiling range of 430 to 725° F. was conducted with a bauxite catalyst. The apparatus used was similar to that described above and a constant pressure of 70 pounds per square inch was maintained. A continuously flowing mixture of 100 parts by weight of gas oil and 47 parts by weight of steam was preheated to 1010° F. in a preheater and then charged to the catalyst case at the rate of 1.0 liquid volumes of hydrocarbon charge per volume catalyst per hour. At the head of the catalyst case 18.4 pounds of steam at 330° F. was added for every 100 pounds of gas oil charged and the temperature of the total mixture entering the catalyst chamber was brought to 960° F. During the eight-hour conversion period the amount of added steam at 330° F. was gradually decreased from the maximum of 23 pounds at the beginning to zero for the last 30 minutes of the run. The temperature of the reaction mixture at the catalyst inlet thus rose gradually from 960 to 1010° F. while the mol ratio of total diluent to hydrocarbon charge varied gradually from about 9:1 to 6:1. A conversion of the gas oil of 42 volume per cent was obtained and over 90 per cent of this converted material was recovered as stabilized end-point gasoline.

When a charge mixture containing the constant mol ratio of steam to hydrocarbon of about 7.5 to 1 and heated to 975° F. was passed into the catalyst chamber in the conventional manner, the rate of charge of the hydrocarbon and the pressure was the same as in the previous operation. The average conversion over the eight-hour period was only 34 volume per cent of the gas oil charged.

*Example II*

A butene dehydrogenation reaction was carried out with a bauxite-barium hydroxide catalyst in a manner similar to Example I. A mixture having the composition of one mol butene and two mols steam was preheated to 1220° F. and just before said mixture entered the catalyst chamber it was diluted with one mol of steam at 740° F. thus giving an initial reaction temperature of about 1160° F. The butene was charged at the rate of about 1.0 liquid volume per volume catalyst per hour and the pressure was kept at slightly above atmospheric. During the eight hour run the amount of added steam at 740° F. was gradually decreased from the maximum of one mol per mol of butene charged to zero. The temperature of the reaction mixture thus ranged from 1160 to 1220° F. and the mol ratio of total diluent to hydrocarbon varied from 3:1 to 2:1. An average per pass conversion of 40 per cent of the charge was obtained and 50 per cent of the converted material was butadiene.

While the foregoing description and exemplary operations have been relatively specific with regard to certain preferred applications of the process, it will be obvious that the principles are of wide scope and general application within the broad terms of the disclosure. No limitations are, therefore, intended except as expressed in the appended claim.

I claim:

A process for the catalytic dehydrogenation of a butene to produce 1,3-butadiene in the presence of an active bauxite-barium hydroxide catalyst mass which progressively declines in activity on continued use, which comprises passing to a catalyst zone containing said catalyst a stream of butene and steam, in the proportion of one mol of butene to two mols of steam, preheated to a temperature of approximately 1220° F. at the rate of 1.0 liquid volume of butene per volume of catalyst which stream is admixed with a second stream consisting of steam at a temperature of approximately 740° F. at such a flow rate that the temperature of the mixed stream is approximately 1160° F., thereafter, as the activity of the catalyst declines progressively, decreasing the flow rate of the second stream of steam so that the temperature of the mixed stream at the inlet to the catalytic zone gradually increases from approximately 1160° F. to approximately 1220° F. in accordance with the progressively declining activity of the catalyst without changing substantially the temperature or flow rate of said stream of butene and steam or the conversion rate of the butene to butadiene.

WALTER A. SCHULZE.